3,323,992
ANTACID COMPOSITION OF HYDRATED MAGNESIUM ALUMINATE CONTAINING BOUND SULFATE
Remsen Ten Eyck Schenck, Bangor, Pa., assignor to Keystone Chemurgic Corporation, Bethlehem, Pa., a corporation of Pennsylvania
No Drawing. Original application Sept. 29, 1960, Ser. No. 59,155. Divided and this application Oct. 29, 1963, Ser. No. 319,695
2 Claims. (Cl. 167—55)

The present invention relates to a new chemical compound consisting of hydrated magnesium aluminate containing bound sulfaate, and processes for its production.

This application is a division of my copending application Ser. No. 59,155, filed Sept. 29, 1960, now abandoned, which application was partly a continuation-in-part of my then copending application Ser. No. 839,303, filed Sept. 11, 1959, and now abandoned, which application was a continuation-in-part application of my then copending application Ser. No. 647,448, filed Mar. 21, 1957, and now abandoned.

The anhydrous form of magnesium aluminate, $$MgAl_2O_4$$

is exemplified by the well-known mineral spinel. It has also been synthesized by heating at a very high temperature a mixture of magnesium and aluminum oxides. In this state, it is comparatively inert toward nearly all chemical reagents, and possesses a high fusing point. Particularly well-crystallized specimens are valued as gemstones; except for this and some limited use as a refractory, the substance is of little interest chemically and of none at all biologically.

It has also been proposed to produce metal aluminates by reacting an alkali metal aluminate and a salt of a metal. Reactions of this sort are described in U.S. Patents 2,395,931 and 2,413,184 and result in products which are relatively inactive chemically and which have substantially lower water contents and greater particle size characteristics than the product of the present invention.

In my copending application Ser. No. 59,155, filed Sept. 29, 1960, I have explained that magnesium aluminates may be economically prepared in a hitherto-undescribed, highly hydrated and chemically active form. When produced by one of the wet processes therein described, the hydrated magnesium aluminates are finely-divided, tasteless, insoluble white powders which, in contrast to the magnesium aluminate products hitherto known are highly reactive toward many chemical reagents, notably toward acids.

A suspension of such hydrated magnesium aluminates in distilled water shows a pH of 8.0 to 8.5. On addition of dilute acid, such as N/10 HCl, the first action involves decomposition of the molecule into aluminum hydroxide and magnesium chloride. The latter dissolves, while the former remains suspended in a very highly active form. Two equivalents of acid are consumed in this step, and the pH drops to approximately 4. Further additions of acid to the mixture react with the liberated aluminum hydroxide. This step takes place at a constant pH; no reduction of pH below 4 can occur until all the aluminum hydroxide is consumed. Since six additional equivalents of acid are required for this, the buffer action of the hydrated magnesium aluminates in the region of pH 4 is pronounced.

By virtue of the above properties, the hydrated magnesium aluminates are of interest pharmacologically, as a treatment for excessive gastric acidity. Unlike many other remedies of this type, it cannot over-alkalize the gastric juice when used in normal or usual doses. It establishes a pH in the ideal range near 4 in the stomach, and maintains this for an extended period in spite of continual secretion of additional acid by the stomach.

The hydrated magnesium aluminates containing bound sulfate of this invention are devoid of toxicity, their metabolic products being simple magnesium and aluminum salts, and may thus be freely ingested, the dosage required is small because of its low equivalent weight. In spite of the relatively high degree of hydration of the salt, the equivalent weight is only 40, which is comparable with those of calcium carbonate and magnesium carbonate, and less than half as great as that of sodium bicarbonate.

Hydrated magnesium aluminate cointaining bound sulfate contains no carbon dioxide, and thus is not a carminative. In some applications this is a decided benefit, as for instance where a simple antacid, effect, unaccompanied by eructation, is desired.

Few side-effects, and those of no importance, have been reported to accompany the use of aluminum and magnesium compounds as antacids. The former occasionally produces a slight tendency to constipation, while the latter sometimes has a laxative action. Neither effects is appreciable in normal dosage. Furthermore, it is believed that combining the two substances in a single treatment, as in hydrated magnesium aluminate, results in cancellation of the two factors.

Hydrated magnesium aluminate containing bound sulfate may profitably be used as an additional ingredient in pharmaceutical formulations designed primarily for other purposes than control of gastric acidity. For example certain substances widely employed as analgesics have, as a side-effect, the property of irritating the gastric mucosa into secreting more than the normal amount of acid. The hydrated magnesium aluminate containing bound sulfate of the present invention may be advantageously incorporated with such analgesics.

I have found that the processes as provided in accordance with this invention may be used to produce hydrated magnesium aluminates containing bound sulfate, which processes are illustrated in more specific detail in the following examples:

Example 1.—In a reaction vessel equipped with a mechanical stirrer, means for adding simultaneously two separate liquids at individually controlled rates, and a set of electrodes for determination of the pH of the mixture, is placed a solution of 75 gm. of magnesium sulfate heptahydrate (common Epsom salt) in 1 liter of water. A quantity of sodium aluminate containing 0.4 gram-atoms of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute sulfuric acid (conveniently of about 10% strength) is commenced. The flow of both sodium aluminate and sulfuric acid solutions is so regulated throughout that the pH of the reaction mixture is maintained between 8 and 9. When all the aluminate soultion has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma, there is obtained approximately 60 gm. of a finely-divided white powder which is rapidly and completely soluble in dilute acids.

Example 2.—In a reaction vessel equipped with a mechanical stirrer, means for adding simultaneously two separate liquids at individually controlled rates, and a set of electrodes for determination of the pH of the mixture, is placed a solution of 75 gm. of magnesium sulfate heptahydrate (common Epsom salt) in 1 liter of water. A quantity of sodium aluminate containing 0.4 gram-atom of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute hydrochloric acid (conveniently of about 10% strength) is commenced. The flow of both sodium aluminate and hydrochloric acid solution is so regulated throughout that the pH of the reaction mixture is maintained between 8 and 9. When all the aluminate solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma there is obtained approximately 60 gm. of a finely-divided white powder which is rapidly and completely soluble in dilute acids.

Example 3.—In a reaction vessel equipped with a mechanical stirrer, means for adding simultaneously two separate liquids at individually controlled rates, and a set of electrodes for determination of the pH of the mixture is placed a solution of 75 gms. of magnesium sulfate heptahydrate (common Epsom salt) is 1 liter of water. A quantity of sodium aluminate containing 0.4 gram-atom of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute acetic acid (conveniently of about 10% strength) is commenced. The flow of both sodium aluminate and acetic acid solutions is so regulated throughout that the pH of the reaction mixture is maintained between 8 and 9. When all of the aluminates solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma, there is obtained approximately 60 gm. of a finely-divided white powder which is rapidly and completely soluble in dilute acids.

When the material produced by the processes of the above examples is dried at the lowest effective temperature, it contains about 32% $Al_2O_3$ and about 12.5% $MgO$. More vigorous conditions of drying drive off part of the water of hydration with the result that the aluminum oxide content increases to about 38% and the magnesium oxide content to about 15%. Ignition of the latter material at 900–1000° C. drives off approximately 47% of the initial weight as volatile product. The fraction thus lost on ignition is preponderately water and also contains an appreciable amount of $SO_3$. That this sulfur must be combined in the product follows from the observation that leaching with water extracts only negligible amounts of sulfate; since both magnesium and aluminum sulfates are freely soluble in water the sulfur cannot be present in either of these forms. Only by complete solution of the material in an acid such as hydrochloric acid can the sulfate be liberated from its bound condition. So treated, a material containing 38% $Al_2O_3$ and 15% $MgO$ is found to contain 15% $SO_3$. This corresponds to an oxide ratio of $2Al_2O_3:2MgO:SO_3$.

While I have described the present invention in terms of preferred examples, it will be understood that various modifications and supplemental steps may be employed in carrying out the process as defined in the appended claims. For instance in the step of regulating the pH by addition of dilute acid, other common acids may be substituted for those described; any acid which forms a soluble salt with magnesium may be chosen. Furthermore, both the magnesium salt and the alkali metal aluminate may be dissolved in water to give solutions of concentrations widely different from the specific examples cited. Likewise, the alkali metal aluminate may be the aluminate of lithium, sodium, potassium, rubidium, or cesium, although the sodium or potassium aluminate is preferred as being more readily available. The proportions of magnesium and aluminum taken may be stoichiometrically exact, or the magnesium may be taken in excess over a wide range.

For use as an antacid, the hydrated magnesium aluminate containing bound sulfate of this invention is preferably tabletted in unit doses containing approximately 5 grains of the active ingredient per tablet. Sugar, dextrin or other binder can be used in the tabletting operation.

For the treatment of gastric hyperacidity, these tablets are taken by mouth. A single 5-grain dose is nearly always sufficient to afford prompt relief. If distress recurs, the dose may be repeated. Following treatment with the product of the present invention, the duration of effective gastric acidity control is more prolonged than that attained with products that do cause acid rebound.

The hydrated magnesium aluminate containing bound sulfate of this invention may also be included to good effect in analgesic preparations. For example, standard 5-grain aspirin tablets which have been formulated to contain 2 to 3 grains of hydrated magnesium aluminate containing bound sulfate per tablet are noticeably less likely to provoke symptoms of hyperacidity than plain aspirin. Such tablets do not require a binder, as the aspirin itself serves this purposes very well. It is sufficient to mix the ingredients intimately, including any lubricants and excipients, granulate with a non-aqueous fluid such as alcohol, and compress into tablets.

Having thus described my invention, I claim:

1. An essentially non-systemic anti-acid composition prepared in unit dosage quantity for combatting excessive gastric acidity, comprising a binder and hydrated magnesium aluminate containing bound sulfate and characterized by the oxide ratio $$2Al_2O_3:2MgO:SO_3$$

2. An essentially non-systemic anti-acid composition prepared in unit dosage quantity for combatting excessive gastric acidity, comprising a binder and hydrated magnesium aluminate containing bound sulfate and characterized by the formula $$2Al_2O_3 \cdot 2MgO \cdot SO_3 \cdot 10H_2O$$

References Cited

UNITED STATES PATENTS

| | | | |
|---|---|---|---|
| 2,413,184 | 12/1946 | La Lande | 23—52 |
| 2,783,124 | 2/1957 | Grote | 23—14 |
| 3,066,073 | 11/1962 | Ratcliff | 167—55 |
| 3,099,524 | 7/1963 | Gossmith | 23—14 |
| 3,156,615 | 11/1964 | Denison | 167—55 |

ALBERT T. MEYERS, *Primary Examiner.*

IRVING MARCUS, SAM ROSEN, *Examiners.*